(12) United States Patent
Hörlin et al.

(10) Patent No.: US 12,736,341 B2
(45) Date of Patent: Sep. 15, 2026

(54) QUEUE OF DATA COLLECTION TASKS FOR SURVEYING INSTRUMENT

(71) Applicant: Trimble Inc., Westminster, CO (US)

(72) Inventors: Christer Hörlin, Danderyd (SE); Set Svanholm, Sollentuna (SE)

(73) Assignee: Trimble Inc., Westminster, CO (US)

( * ) Notice: Subject to any disclaimer, the term of this patent is extended or adjusted under 35 U.S.C. 154(b) by 330 days.

(21) Appl. No.: 16/820,272

(22) Filed: Mar. 16, 2020

(65) Prior Publication Data

US 2020/0217661 A1 Jul. 9, 2020

Related U.S. Application Data

(63) Continuation of application No. PCT/EP2017/074403, filed on Sep. 26, 2017.

(51) Int. Cl.
*G01C 15/00* (2006.01)
*G01B 11/00* (2006.01)
(Continued)

(52) U.S. Cl.
CPC ........... *G01C 15/002* (2013.01); *G01C 15/00* (2013.01); *G01B 11/002* (2013.01); *G01C 1/04* (2013.01); *G01C 11/04* (2013.01); *G01C 21/165* (2013.01)

(58) Field of Classification Search
None
See application file for complete search history.

(56) References Cited

U.S. PATENT DOCUMENTS 4,658,351 A * 4/1987 Teng ..................... G06F 9/4881 718/107
5,012,409 A * 4/1991 Fletcher ................ G06F 9/4887 718/107
(Continued)

FOREIGN PATENT DOCUMENTS

CN 102362481 A 2/2012
CN 104065431 A * 9/2014
(Continued)

OTHER PUBLICATIONS

CA-2252409-A1 Document (Year: 1997).*
(Continued)

*Primary Examiner* — Arleen M Vazquez
*Assistant Examiner* — Leonard S Liang
(74) *Attorney, Agent, or Firm* — Kilpatrick Townsend & Stockton LLP

(57) ABSTRACT

Methods, controllers and computer program products for efficient utilization of a surveying instrument are provided. The surveying instrument may perform different types of data collection tasks, at least one of which includes measuring a direction and/or a distance to a target. The surveying instrument is controlled to perform one or more data collection tasks in accordance with a queue of one or more data collection tasks. The queue includes a data collection task of at least one of the different types of data collection tasks. During an ongoing data collection task or during an ongoing sequence of data collection tasks, an instruction is received. The instruction indicates an additional data collection task to be performed by the surveying instrument in addition to the one or more tasks already in the queue. The surveying instrument is controlled to perform data collection tasks in an order determined based on the queue and the received instruction.

14 Claims, 8 Drawing Sheets

(51) Int. Cl.
*G01C 1/04* (2006.01)
*G01C 11/04* (2006.01)
*G01C 21/16* (2006.01)

(56) References Cited

U.S. PATENT DOCUMENTS 5,247,675 A * 9/1993 Farrell .................. G06F 9/4881 718/107
5,940,612 A * 8/1999 Brady .................. G06F 9/4881 718/103
5,956,661 A * 9/1999 Lefebvre ............. G01C 15/002 702/155
6,006,249 A * 12/1999 Leong .................. G06F 9/5038 718/107
6,493,650 B1 12/2002 Rodgers et al.
9,200,414 B1 * 12/2015 Brenner ............... G01B 11/245
9,903,957 B2 * 2/2018 Wallace .................. G01S 19/41
9,939,263 B2 * 4/2018 Green .................. G01C 15/002
9,945,959 B2 * 4/2018 Wallace .................. G01S 19/43
10,337,865 B2 * 7/2019 Green .................... H04N 7/183
2005/0125770 A1 6/2005 Arsenault et al.
2007/0220517 A1 * 9/2007 Lippett ................. G06F 9/5038 718/102
2012/0215759 A1 8/2012 McCoy et al.
2013/0066944 A1 * 3/2013 Laredo .................. G06Q 50/01 709/203
2016/0061954 A1 * 3/2016 Walsh ....................... G06T 7/97 356/139.03
2016/0138915 A1 * 5/2016 Green .................. G01C 15/002 356/4.01
2016/0138919 A1 * 5/2016 Green .................. G01C 15/002 348/135
2016/0178801 A1 * 6/2016 Bobrek .................. G01V 1/303 703/2
2017/0337743 A1 * 11/2017 Metzler .................. G01C 15/02

FOREIGN PATENT DOCUMENTS

CN 105606076 A 5/2016
EP 3 021 079 A1 5/2016
WO 2010/096313 A2 8/2010

OTHER PUBLICATIONS

DE-102010011528-A1 Document (Year: 2011).*
Machine Translation for CN104065431A (Year: 2014).*
Merged Original + Machine Translation for CN106648847A (Year: 2017).*
Leica HDS3000 Spec Sheet (Year: 2005).*
International Preliminary Report on Patentability for Application No. PCT/EP2017/074403, mailed Jan. 16, 2020, 10 pages.
International Search Report and Written Opinion for Application No. PCT/EP2017/074403, mailed Jun. 20, 2018, 12 pages.

* cited by examiner

QUEUE OF DATA COLLECTION TASKS FOR SURVEYING INSTRUMENT

CROSS-REFERENCE TO RELATED APPLICATIONS

The present application is a continuation of International Application No. PCT/EP2017/074403, filed Sep. 26, 2017, the contents of which are incorporated herein by reference in their entirety for all purposes.

TECHNICAL FIELD

The present disclosure generally relates to the field of surveying. In particular, the present disclosure relates to methods and devices for controlling surveying instruments.

BACKGROUND

The field of surveying includes determination of positions, surfaces or volumes using measurements of distances and angles. Such measurements may be performed using electric distance measuring (EDM) devices integrated in surveying instruments such as geodetic scanners or total stations. It is generally desirable to use such surveying instruments as efficiently as possible without affecting the accuracy of the measurements.

For example, US2005/0125770 discloses a system and method for surveying and modelling a site. The system may be employed for staking out the site based on plans or CAD files for the site. The system may queue up different objects/features for staking in the most efficient order, or in an order predetermined by the operator. This may be managed by an integral module of a CAD module which administers the queued up objects and determines sequencing and timing of the individual staking out tasks sent to a survey measurement device using a bi-directional communication link. The ability to queue up objects/features for staking in the most efficient order allows the system to perform surveying more efficiently.

However, it would be desirable to provide further methods and controllers for an improved utilization of surveying instruments.

SUMMARY

An object of the present disclosure is to address at least one of the issues described above. To achieve this, a method of controlling a surveying instrument, a controller for controlling a surveying instrument, and a corresponding computer program product are provided. Further embodiments are defined in the dependent claims.

According to first aspect, a method of controlling a surveying instrument is provided. The surveying instrument is operable to perform different types of data collection tasks. At least one of the different types of data collection tasks includes measuring a distance and/or a direction to a target (for example via use of an electronic distance measurement device). The method comprises controlling the surveying instrument to perform one or more data collection tasks in accordance with a queue of one or more data collection tasks. The queue includes a data collection task of at least one of the different types of data collection tasks. The method comprises receiving, during an ongoing data collection task or during an ongoing sequence of data collection tasks as defined by the queue, an instruction indicating an additional data collection task to be performed by the surveying instrument in addition to the one or more data collection tasks already in the queue. The method comprises controlling the surveying instrument to perform data collection tasks in an order determined based on the queue and the received instruction.

Some types of data collection tasks may take quite a long time for a surveying instrument to perform. Rather than having to wait until an ongoing data collection task (in other words a data collection task currently being performed) has been completed by the surveying instrument, an instruction indicating an additional data collection task to be performed may be entered to employ the time during which the ongoing data collection task is being performed. This allows the surveying instrument to be more efficiently utilized and/or allows the user of the surveying instrument to save time. Similarly, rather than having to wait until an ongoing sequence of data collection tasks has been completed by the surveying instrument, an instruction indicating an additional data collection task to be performed may be entered to employ the time during which the ongoing sequence of data collection tasks is being performed. This allows the surveying instrument to be more efficiently utilized and/or allows the user of the surveying instrument to save time.

The use of the queue may for example allow new data collection tasks (such as the next data collection tasks in the queue) to be performed by the surveying instrument once a data collection task has been completed, rather than the surveying instrument being idle (or unused) until a user instructs it to perform a new data collection task.

The ongoing data collection task may for example be a data collection task from the queue. A data collection task in the queue may for example be removed from the queue when the surveying instrument initiates the task or when the surveying instrument completes the task.

If the ongoing data collection task is to be completed before the additional data collection task is to be performed, then the additional data collection task may for example be added to (or inserted into) the queue.

If the ongoing data collection task is to be interrupted in favor of the additional data collection task, then the remaining part of the ongoing data collection task may for example be placed in (or reinserted into) the queue so that it may be continued after the additional data collection task has been completed.

The surveying instrument may for example be a geodetic scanner or a total station.

The received instruction may for example explicitly indicate the additional data collection task, such as by itself including the additional data collection task.

The received instruction may for example implicitly indicate the additional data collection task. The instruction may for example be received in the form of a signal caused by a user pushing a certain button, which may be interpreted as an instruction to perform the additional data collection task.

The queue of one or more data collection tasks may for example be stored at the surveying instrument, or at a remote location.

The different types of data collection tasks may for example include use of different types of sensors (such as an electronic distance measurement sensor and a camera), use of measurements with different precision, and/or different numbers of measurements (such as one or a few measurements and a large set of measurements including for example at least 10, 20 or 30 measurements).

It will be appreciated that a data collection task (such as an ongoing data collection task during which an additional data collection task may be received) may for example include multiple subtasks or measurements, such as distance measurements in a scanning operation. Between such subtasks or measurements, there may for example be brief pauses or delays during which the surveying instrument may for example rotate, perform self-calibration, perform a self-check for potential errors, or adapt its own settings. Such pauses during a data collection task are typically short relative to the total duration of the data collection task.

It will also be appreciated that an ongoing sequence of data collection tasks as defined by the queue may for example include delays between the respective tasks. An instruction indicating an additional data collection task to be performed by the surveying instrument may for example be received during a task of the ongoing sequence or during a delay of the ongoing sequence.

According to some embodiments, controlling the surveying instrument to perform data collection tasks in an order determined based on the queue and the received instruction may comprise controlling (or causing) the surveying instrument to interrupt the ongoing data collection task, controlling the surveying instrument to perform the additional data collection task indicated by the received instruction, and controlling the surveying instrument to continue the interrupted data collection task after the additional data collection task has been completed. While the surveying instrument is performing the additional data collection task, the remaining part of the interrupted data collection task may for example be placed in (or reinserted into) the queue.

Some types of data collection tasks may take quite a long time for a surveying instrument to perform. During that time, an opportunity may arise at which a user wants to perform a different data collection task. The ability to interrupt the ongoing data collection task (or to put the ongoing data collection task on hold) allows the surveying instrument to make use of this opportunity by performing the new data collection task before the ongoing task is completed. This allows for the surveying instrument to be used more efficiently.

For example, a user may have moved (for example walked) over to a position of interest at which a point measurement is to be performed (for example via reflection in prism held by the user at the point of interest). The ability to interrupt the ongoing data collection task allows the surveying instrument to perform the point measurement when the user arrives at the position of interest rather than having to wait for the ongoing task to be completed before performing the point measurement. Thereby, the waiting time for the user may be reduced, especially if point measurements are to be performed at a plurality of different positions.

According to some embodiments, controlling the surveying instrument to perform data collection tasks in an order determined based on the queue and the received instruction may comprise modifying the queue by at least including, in the queue, the additional data collection task indicated by the received instruction, and controlling the surveying instrument to perform data collection tasks in accordance with the modified queue.

The additional data collection task may for example be included first in the queue such that the additional data collection task is the first data collection task performed by the surveying instrument once the ongoing (or the current) data collection task has been completed by the surveying instrument.

The additional data collection task may for example be included at other positions in the queue than the first position of the queue.

According to some embodiments, the additional data collection task indicated by the received instruction may include measuring a distance, measuring and a direction, capturing a picture via a camera, or tracking a target (such as a prism). Distances and/or directions (or angles) to a target may for example be measured via use of an electronic distance measurement device, which may for example be arranged in the surveying instrument.

According to some embodiments, the ongoing data collection task may be a type of data collection task which takes longer time to complete (or to perform) than the additional data collection task indicated by the received instruction.

An ability to interrupt the ongoing data collection task in favor of the additional data collection task may be particularly desirable in case the ongoing data collection task is of a type which takes a long time to perform. In such cases, interrupting the ongoing data collection task could potentially save a lot of time.

According to some embodiments, the ongoing data collection task may comprise a scanning operation including a plurality of measurements (for example electronic distance measurements) corresponding to respective different sighting directions of the surveying instrument. The data collection task indicated by the received instruction may include a measurement (for example an electronic distance measurement) of higher precision than the measurements of the scanning operation.

The measurement of higher precision may for example include a measurement via reflection at a reflecting element arranged at the target, for example a prism (such as a corner cube prism), and/or forming an average of multiple measurements towards the same target.

Measurements corresponding to different sighting directions of the surveying instrument may for example be performed by rotating a scanning head or center unit of the surveying instrument, and/or by rotating a prism or a mirror of the surveying instrument.

If the measurements are to be performed via reflection of light at a prism arranged at the target, the prism (or target) may be moved/relocated to different positions in accordance with different sighting directions.

According to some embodiments, the additional data collection task indicated by the received instruction may include measuring a distance and/or a direction (or angle) to a target located at a known position (for example via use of an electronic distance measurement device). The method may further comprise computing an orientation and/or a position of the surveying instrument based on data collected at the additional data collection task indicated by the received instruction.

The computed position and/or orientation of the surveying instrument may for example be employed for geo referencing, i.e. for determining the position of the surveying instrument in relation to a number of known positions (to which an operator has walked with the target/prism for example) located at the site in question. Geo referencing serves to relate all measurements, such as individual measurements, photographs and/or scans of surroundings of the surveying instrument, to a common coordinate system.

The target located at a known position may for example be a prism (such as a corner cube prism), which may for example be held at the known position by a user. The position of the target may for example be known via use of a Global Navigation Satellite System (GNSS) receiver (for example using the Global Positioning System, GPS) or be a known position marked on the ground.

It will be appreciated that the orientation and/or position of the surveying instrument may for example be computed based on measurements of distances and angles (or directions) to targets located at two different positions. The same target may for example be employed for the two different positions. A user may for example move (for example by walking or driving) to the first position, place the target there and instruct the surveying instrument to make the first measurement of distance and angles. The user may then move (for example by walking or driving) to the second position, place the target there and instruct the surveying instrument to make the second measurement of distance and angles. An ability to interrupt an ongoing data collection task in favor of such measurements may allow the time spent by the user waiting at the respective positions to be reduced.

At the same time, controlling the surveying instrument with a queue allows for the use of the surveying instrument while the operator is walking from one known position to another for geo referencing for instance. The embodiments described herein therefore provides a reduction of the down time of the surveying instrument, i.e. an improved utilization of the surveying instrument is obtained.

It will also be appreciated that the orientation and/or position of the surveying instrument may for example be computed without measuring distances to targets located at known positions, as long as angles (or directions) to targets located at a sufficient number of known positions are measured instead.

According to some embodiments, the method may further comprise providing, during the ongoing data collection task or during the ongoing sequence of data collection tasks as defined by the queue, a user interface for defining, based on data previously collected by the surveying instrument, the additional data collection task indicated by the received instruction.

Some prior art surveying instruments allow a user to use a camera of the surveying instrument to view the surroundings of the surveying instrument in real time, so as to define in which directions to perform measurements. However, the camera of such surveying instruments is not available for defining new measurements while the surveying instrument is busy performing an ongoing data collection task (such as a scan of the surroundings, which includes rotation of the surveying instrument). The user therefore has to wait until the surveying instrument is idle before a new data collection task may be defined. Further, the ability of defining a task to be performed after an ongoing data collection task while the surveying instrument performs the (ongoing) data collection task improves also the utilization of the surveying instrument in that the task defined during the ongoing data collection task may be started as soon as the ongoing task is completed.

The inventors have realized that data previously collected by the surveying instrument may be employed by a user for defining the additional data collection task, even when the surveying instrument is busy performing an ongoing data collection task, if an appropriate user interface is provided. This allows the surveying instrument to be used more efficiently.

The data previously collected by the surveying instrument may for example be data collected during data collection tasks performed prior to the ongoing data collection task, and/or data collected during the ongoing data collection task.

According to some embodiments, the user interface may be provided for defining, based on data previously collected by the surveying instrument, one or more sighting directions of the surveying instrument for which to acquire sensor signals as part of the additional data collection task.

The one or more sighting directions may for example be defined by a user (or operator) based on sighting directions employed for collecting the data previously collected by the surveying instrument.

The sensor signals to be acquired as part of the additional data collection task may for example be electronic distance measurement signals, or camera signals (such as image signals, for example digital image signals).

According to some embodiments, providing the user interface may include controlling a display to visualize the data previously collected by the surveying instrument. A user may for example employ this visualization to define the additional data collection task indicated by the received instruction.

According to some embodiments, the ongoing data collection task may include acquiring a sequence of sensor signals corresponding to respective different sighting directions from the surveying instrument. These sensor signals may for example include distance measurement signals (for example obtained via a scan of a surroundings of the surveying instrument), angle measurement signals (for example obtained via a scan of a surroundings of the surveying instrument), or image signals captured by a camera (for example obtained via capturing of a panorama of a surroundings of the surveying instrument). The sensor signals may for example include electronic distance measurement signals.

According to some embodiments, controlling the surveying instrument to perform one or more data collection tasks in accordance with the queue may include controlling the surveying instrument to perform one or more data collection tasks in an order defined by the queue.

According to some embodiments, the method may further comprise determining, based on the queue and the received instruction, an order in which the surveying instrument is to perform data collection tasks. The received instruction may for example indicate whether to interrupt the ongoing data collection task (so that the additional data collection task may be performed before the ongoing task is completed), or whether to complete the ongoing data collection task before performing the additional data collection task.

According to some embodiments, the method may comprise receiving, during an ongoing data collection task or during an ongoing sequence of data collection tasks as defined by the queue, a second instruction. The method may comprise, in response to the second instruction, modifying the queue by at least modifying a data collection task in the queue or removing a data collection task from the queue. The method may comprise controlling the surveying instrument to perform data collection tasks in accordance with the modified queue.

The modification of a data collection task in the queue may for example include changing a sighting direction of the surveying instrument for which to obtain a sensor signal, changing a resolution of a scan of the surroundings of the surveying instrument, or changing a zoom level of a camera from which to acquire an image.

According to a second aspect, a computer program product is provided. The computer program product comprises a computer-readable medium with instructions for performing the method of any of the embodiments described above. The computer-readable medium may for example be a non-transitory computer-readable medium.

According to a third aspect, a controller (or control unit) for controlling a surveying instrument is provided. The surveying instrument is operable to perform different types of data collection tasks. At least one of the types of data collection tasks includes measuring a distance and/or a direction (for example via use of an electronic distance measurement device) to a target. The controller is configured to control the surveying instrument to perform one or more data collection tasks in accordance with a queue of one or more data collection tasks. The queue includes a data collection task of at least one of the types of data collection tasks. The controller is configured to receive, during an ongoing data collection task or during an ongoing sequence of data collection tasks as defined by the queue, an instruction indicating an additional data collection task to be performed by the surveying instrument in addition to the data collection tasks already in the queue. The controller is configured to control the surveying instrument to perform data collection tasks in an order determined based on the queue and the received instruction.

The controller may for example be configured to perform the method of any of the embodiments described above in connection with the first aspect.

The controller may for example comprise a first interface for receiving the instruction. The first interface may for example be a human-machine interface. The first interface may for example be a data interface.

The controller may for example comprise a second interface for controlling the surveying instrument. The second interface may for example be a wired interface or a wireless interface.

The controller may for example comprise a memory for storing the queue of one or more data collection tasks.

The queue may for example be stored at a location remote from the controller. The controller may for example comprise a third interface for accessing the queue. The third interface may for example be a wired interface or a wireless interface.

According to a fourth aspect, a surveying instrument is provided. The surveying instrument comprises one or more sensors for performing different types of data collection tasks. At least one of the types of data collection tasks includes measuring a distance and/or a direction (angles) to a target. The surveying instrument comprises a controller as defined in any of the embodiments described above in connection to the third aspect.

The one or more sensors may for example include a camera and/or an electronic distance measurement device.

It will be appreciated that the controller may for example be arranged as a separate unit which may be located remotely from other parts of the surveying instrument.

According to some embodiments, the surveying instrument may comprise a scanning head rotatable about an axis. The surveying instrument may be arranged to perform measurements (for example electronic distance measurements) in different directions via use of the scanning head.

According to some embodiments, the surveying instrument may comprise a base, an alidade mounted at the base for rotation about a first axis, and a center unit mounted at the alidade for rotation about a second axis. The surveying instrument may be arranged to perform measurements (for example electronic distance measurements) in different directions via use of the center unit.

According to a fifth aspect, a method of controlling a surveying instrument is provided. The surveying instrument may be operable to perform different types of data collection tasks. At least one of the different types of data collection task may include measuring a distance and/or a direction to a target (for example via use of an electronic distance measurement device). Embodiments of the method according to the fifth aspect may be analogous to the embodiments of the method according to the first aspect described above, except that the step of, during an ongoing data collection task or during an ongoing sequence of data collection tasks as defined by the queue, receiving an instruction indicating an additional data collection task to be performed by the surveying instrument in addition to the one or more data collection tasks already in the queue may be optional. Instead, methods according to embodiments of the fifth aspect may comprise the step of, during an ongoing data collection task, providing a user interface for defining, based on data previously collected by the surveying instrument, an additional data collection task to be performed by the surveying instrument in addition to the one or more data collection tasks already in the queue.

In other words, methods according to embodiments of the fifth aspect may comprise:

- controlling the surveying instrument to perform one or more data collection tasks in accordance with a queue of one or more data collection tasks, the queue including a data collection task of at least one of the different types of data collection tasks;
- during an ongoing data collection task or during an ongoing sequence of data collection tasks, providing a user interface for defining, based on data previously collected by the surveying instrument, an additional data collection task to be performed by the surveying instrument in addition to the one or more data collection tasks already in the queue; and
- controlling the surveying instrument to perform data collection tasks in an order determined based on the queue and based on an instruction indicating that the additional data collection task is to be performed by the surveying instrument. The instruction may for example be received during the ongoing data collection task, or during a pause or delay between data collection tasks.

It will be appreciated that methods according to embodiments of the fifth aspect may comprise any of the features described above in relation to embodiments of the first aspect.

It is noted that embodiments of the invention relate to all possible combinations of features recited in the claims. Further, it will be appreciated that the various embodiments described for the method in accordance with the first aspect are all combinable with embodiments of the controller in accordance with the third aspect, the surveying instrument of the fourth aspect, and the method of the fifth aspect, and vice versa.

BRIEF DESCRIPTION OF THE DRAWINGS

Exemplifying embodiments will be described below with reference to the accompanying drawings, in which.

All the figures are schematic and generally only show parts which are necessary in order to elucidate the respective embodiments, whereas other parts may be omitted or merely suggested.

DETAILED DESCRIPTION

Figure 1:
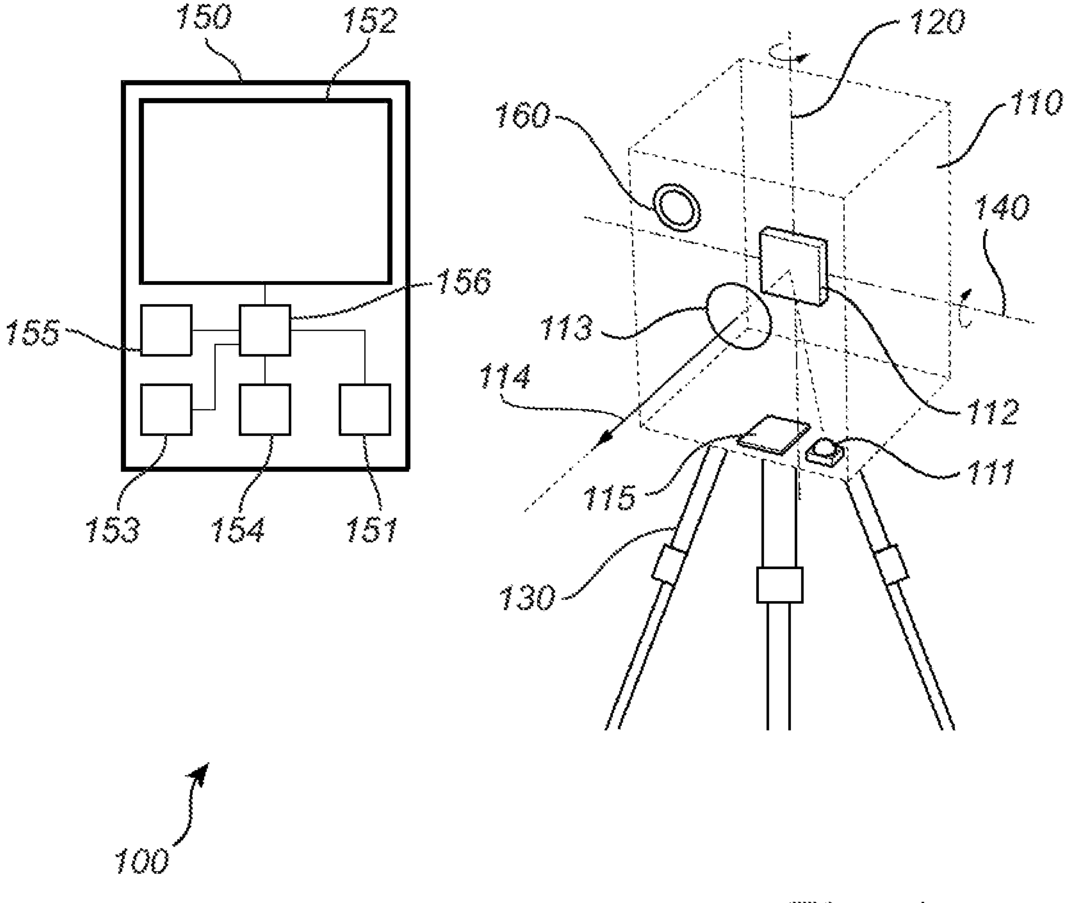
FIGS. 1 and 2 illustrate surveying instruments, according to some embodiments.

FIG. 1 illustrates a surveying instrument 100, according to an embodiment. The surveying instrument 100 in the present embodiment is a geodetic scanner 100 comprising a scanning head 110 rotatable about a first axis 120. The scanner 100 is arranged to perform measurements in different directions via use of the scanning head 110. The measurements performed by the scanner 100 include distances and/or directions (or angles) to objects in the surroundings of the scanner 100. The different directions in which measurements may be performed may be referred to as sighting directions of the scanner 100. The scanner 100 may for example be mounted on a tripod 130. The scanner 100 may for example comprise an electronic distance measurement device (EDM) for performing measurements.

The scanning head 110 comprises a light source 111 for emitting light, and an optical element 112 such as a prism or a mirror for directing the light through an opening (or objective) 113 of the scanning head 110. Depending on the orientation (rotation) of the prism or mirror 112 and the orientation of the scanning head 110, different sighting directions may be obtained. The light 114 exiting the scanning head 110 through the opening 113 may be reflected at objects in the surroundings of the scanner 100 (such as a target equipped with a prism or other reflecting element and held by an operator) and then may return into the scanning head 110 via the opening 113. An optical sensor 115 may receive the reflected light. Light received into the scanning head 110 through the opening 113 may for example reach the optical sensor 115 via reflection against the optical element 112.

Light in the form of laser pulses may for example be employed to perform the measurements. The light source 111 may for example be a laser diode. A distance to an object in the environment may for example be computed by a processor (not shown in FIG. 1) arranged in the scanner 100. The distance to an object in the environment may be computed based on time of flight measurements, i.e. based on the time for a laser pulse to travel back and forth between the scanning head 110 and the object in the environment. Alternatively, the distance to an object in the environment may be computed based on the phase modulation measurement method.

Further, although it is in the present embodiments referred to a passive target in the sense that the target is equipped with a reflecting element (such as a prism) for reflecting the laser pulse, it will be appreciated that for some data collection tasks such as e.g. tracking, the target may be an active target in the sense that the target is equipped with a laser diode and may itself emit laser pulses (which may be detected by the surveying instrument).

The optical element 112 is rotatable about a second axis 140, which may preferably be orthogonal to the first axis 120. The first axis 120 is typically a vertical axis so that the scanning head 110 may be rotated in the horizontal plane. The second axis 140 is typically a horizontal axis so that an elevation angle of the light 114 exiting the scanning head 110 may be controlled. The rotation around the two axes 120 and 140 allows light beams 114 exiting the scanning head 110 to scan an environment to obtain a 3D cloud of measurement points.

A measurement may include a distance to a target, but may also include the direction to the target. The direction may be defined via an angular position of the scanning head 110 in the horizontal plane (in other words an angular position about the vertical axis 120) and an elevation angle of the light 114 exiting the scanning head 110 via the mirror 112 (in other words an angular position about the horizontal axis 140). The scanner 100 may for example comprise angle sensors (not shown in FIG. 1) for measuring the angular position of the scanning head 110 in the horizontal plane and the elevation angle provided by the optical element 112.

The scanner 100 comprises a controller 150 (or control unit) for controlling the scanner 100. The controller 150 may for example be provided as a separate device freely movable relative to the rest of the scanner 100, or may be an integrated part of the scanner 100. The controller 150 may for example be provided in the form of a handheld device such as a mobile phone or tablet computer running certain software (such as a specifically designed application) for controlling the scanner 100. The controller 150 comprises an interface 151 for communicating with the scanner 100. The interface 151 may for example be a wired or wireless interface.

The controller 150 may for example comprise a screen 152 or display 152 for displaying data collected by the scanner 100. The controller 150 may for example comprise input means such as a touch screen 152, a pointing device, and/or one or more buttons 153, for receiving instructions. The controller 150 may for example comprise a data interface 154 for receiving instructions from another device, such as a remotely located computer. The data interface 154 may for example be a wired or wireless interface. The controller 150 may for example comprise a processor 156 connected to the respective components of the controller 150.

The scanner 100 may for example comprise a camera 160 for capturing images of its surroundings. The camera 160 may be arranged at the scanning head 110. The camera 160 may be configured to capture snap shots and/or may be able to capture panorama views of its surroundings as the scanning head 110 rotates about the vertical axis 120.

Figure 2:
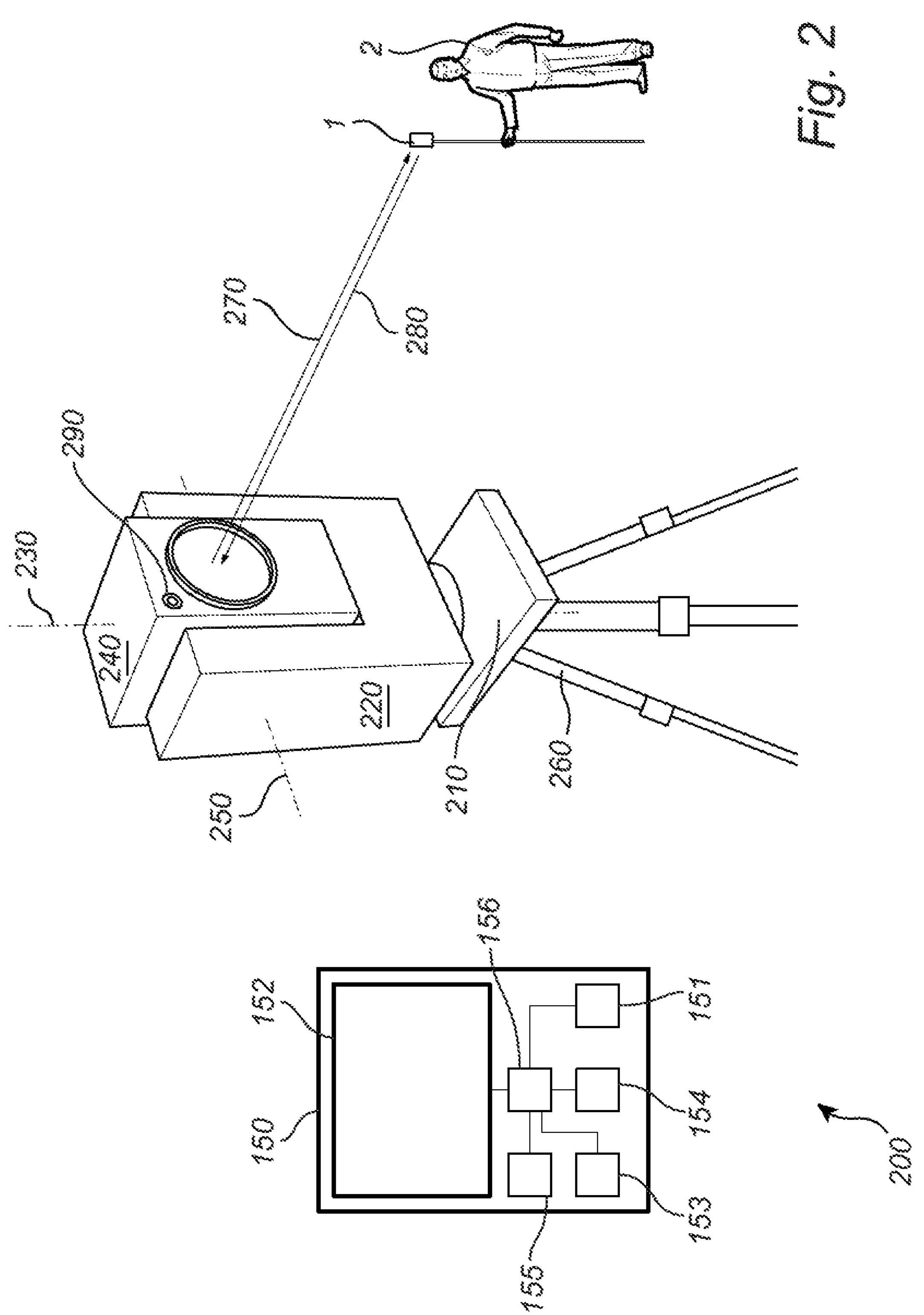

FIG. 2 illustrates a surveying instrument 200, according to an embodiment. The surveying instrument 200 in the present embodiment is a total station 200 comprising a base 210, an alidade 220 mounted at the base 210 for rotation about a first axis 230, and a center unit 240 mounted at the alidade 220 for rotation about a second axis 250. The total station 200 is arranged to perform measurements in different directions (also referred to as sighting directions) via use of the center unit 240. The total station 200 may for example be mounted on a tripod 260. The total station 200 may for example comprise an electronic distance measurement device (EDM) for performing measurements.

The center unit 240 may comprise a light source (not shown in FIG. 2) for emitting light. Light 270 exiting the center unit 240 may be reflected at a target 1, such as a prism held by an operator 2. The reflected light 280 may return to the center unit 240 where an optical sensor (not shown in FIG. 2) receives it. Light in the form of laser pulses may for example be employed to perform the measurements. A distance to the target 1 may for example be computed by a processor (not shown in FIG. 2) arranged in the total station 200. The distance to an object in the environment may be computed based on for example a time of flight of the laser pulse as it travels back and forth between the center unit 240 and the target 1 (see light rays 270 and 280 in FIG. 2).

The first axis 230 is typically a vertical axis so that the alidade 220 and the center unit 240 may be rotated in the horizontal plane. The second axis 250 is typically a horizontal axis so that an elevation angle of the light 270 exiting the center unit 240 may be controlled. The rotation about the two axes 230 and 250 allows the light beam 270 exiting the center unit 240 to be directed in a desired direction.

A measurement may include a distance, but may also include the direction to a target. The direction may be defined via an angular position of the alidade 220 in the horizontal plane (in other words an angular position about the vertical axis 230) and an elevation angle of the light exiting the center unit 240 (in other words an angular position of the center unit 240 about the horizontal axis 250). The total station 200 may for example comprise angle sensors (not shown in FIG. 2) for measuring the angular position of the alidade 220 in the horizontal plane and the elevation angle provided by center unit 240.

While the scanner 100 (described above with reference to FIG. 1) may be employed to perform measurements quickly in a large number of directions, the total station 200 (described with reference to FIG. 2) may be employed to perform individual point measurements at a higher precision. One factor that may improve precision is the use of a special target 1 (such as a corner cube prism) to reflect the light, rather than relying on reflections at unknown surfaces of unknown materials. This may improve the signal-to-noise ratio.

The total station 200 may for example comprise a controller 150 of the same type as the controller 150 of the scanner 100, described above with reference to FIG. 1.

The total station 200 may for example comprise a camera 290 for capturing images of its surroundings. The camera 290 may be arranged at the center unit 240. The camera 290 may be configured to capture snap shots and/or may be able to capture panorama views of its surroundings as the center unit 240 rotates about the vertical axis 230 and/or the horizontal axis 250.

It will be appreciated that the scanner 100 could for example be configured to perform point measurements via reflections against a target equipped with for example a prism, in addition to performing scans of the environment. It will also be appreciated that the total station 200 could for example be configured to perform scans of the environment, in addition to performing point measurements via reflections against a target equipped with a prism.

Figure 3:
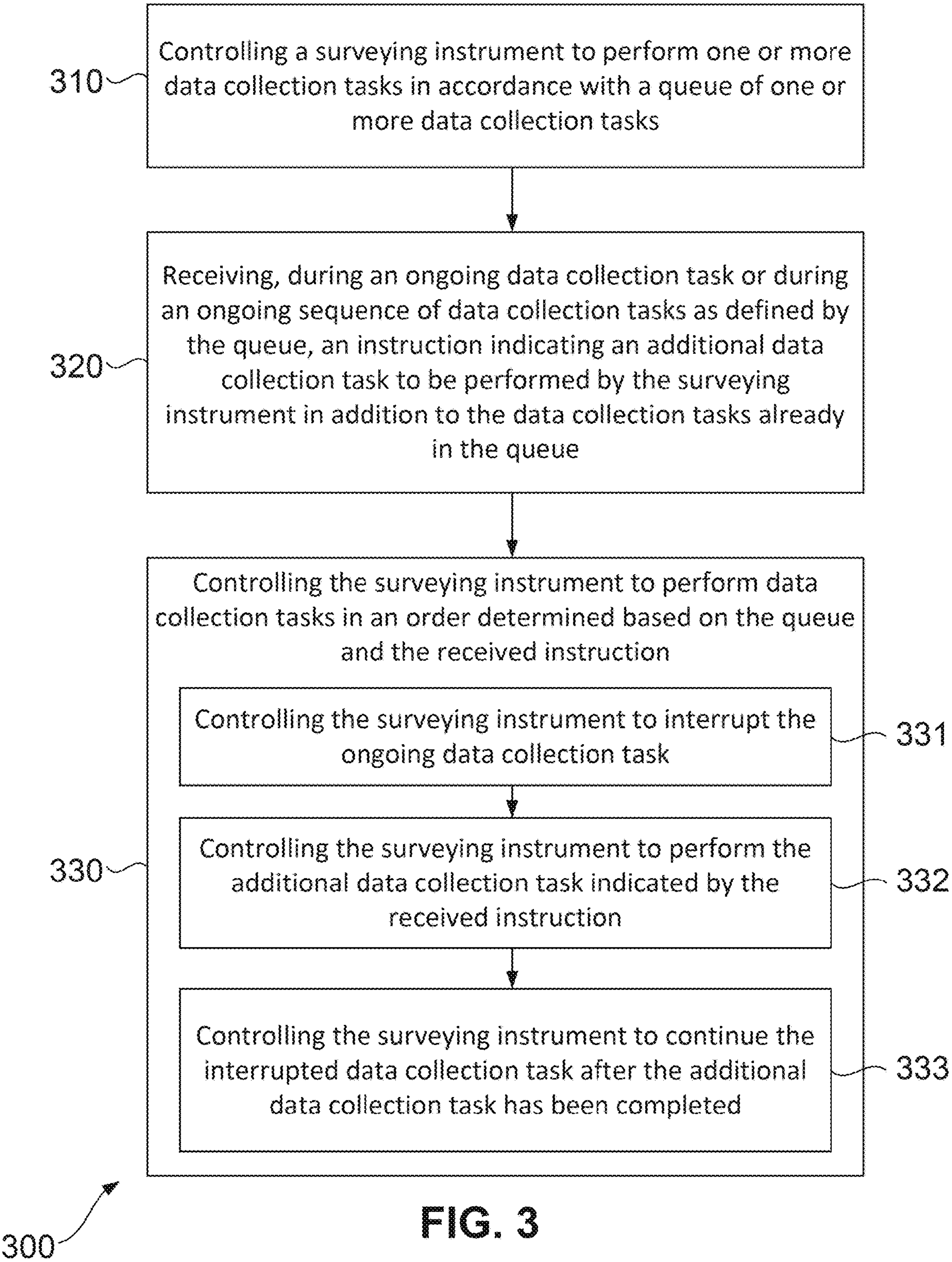
FIG. 3 is a flow chart of a method for controlling a surveying instrument, according to an embodiment.

FIG. 3 is a flow chart of a method 300 for controlling a surveying instrument, according to an embodiment. The surveying instrument is operable to perform different types of data collection tasks. At least one of the different types of data collection tasks includes measuring a distance and/or an angle (or direction). The surveying instrument may for example be a scanner 100 or a total station 200, as described above with reference to FIGS. 1 and 2. The method 300 may for example be performed by the controller 150 (or by a processor 156 of the controller 150) described above with reference to FIGS. 1 and 2.

The method 300 comprises controlling 310 the surveying instrument to perform one or more data collection tasks in accordance with a queue of one or more data collection tasks.

Figure 4:
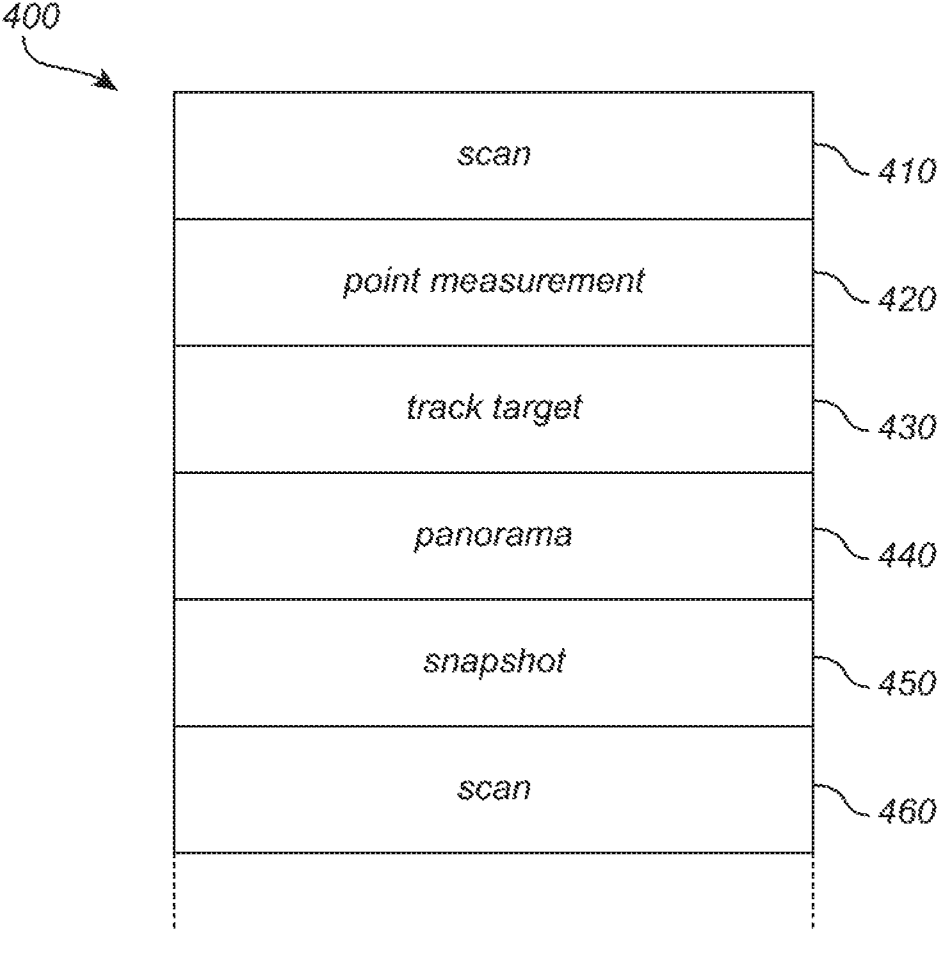
FIG. 4 illustrates an example of a queue of data collection tasks employed by the method illustrated in FIG. 3.

FIG. 4 illustrates an example of such a queue 400 of data collection tasks. The data collection tasks in the queue 400 may be of different types. The data collection tasks in the queue 400 may for example include a scanning operation 410 including measurements performed in a plurality of directions (the measurement for each direction may for example include a measured distance and associated angles), a point measurement 420 using a target 1 (such as a prism), tracking 430 of a target 1 (such as a prism or any other reflecting target or an active target emitting itself a laser pulse), a panorama view 440 captured by a camera (such as the cameras 160 and 290), or a snap shot 450 captured by a camera (such as the cameras 160 or 290). In the present example, the queue 400 also includes a second scanning operation 460. The queue 400 defines and order in which the data collection tasks are to be performed by the surveying instrument. The queue 400 may have been preprogrammed by an operator, and/or may be edited by the operator while the surveying instrument is performing a data collection task. It will be appreciated that the specific queue 400 illustrated in FIG. 4 only serves as an example. The queue 400 may include any number of data collection tasks performable by the surveying instrument, and the tasks in the queue may be arranged in any order.

The method 300 comprises receiving 320, during an ongoing data collection task or during an ongoing sequence of data collection tasks as defined by the queue, an instruction indicating an additional data collection task to be performed by the surveying instrument in addition to the data collection tasks already in the queue. By an ongoing data collection tasks is meant a data collection task which is currently being performed by the surveying instrument. The ongoing sequence of data collection may for example include delays. The instruction may for example be received during such a delay. The instruction may for example be received via a touch screen 152, a button 153, or via a data interface 154.

The method 300 comprises the step of controlling 330 the surveying instrument to perform data collection tasks in an order determined based on the queue and the received instruction. In the present embodiment, this controlling step 330 comprises controlling 331 the surveying instrument to interrupt the ongoing data collection task, controlling 332 the surveying instrument to perform the additional data collection task indicated by the received instruction, and controlling 333 the surveying instrument to continue the interrupted data collection task after the additional data collection task has been completed. In other words, the data collection task which is ongoing (or which is currently being performed) when the instruction is received is interrupted (or put on hold, or paused), and the indicated additional data collection task is performed before the interrupted task is continued. A more detailed example implementation of the method 300 will be described below with reference to FIGS. 5 and 6.

The queue of data collection tasks (such as the example queue 400 described above with reference to FIG. 4) may for example be stored in the controller 150 of a surveying instrument (for example in a memory 155 of the controller), or may be stored at a remote location such as at a server or in the cloud. The queue may be dynamic in the sense that it may be modified during operation of the surveying instrument. Data collection tasks may for example be added to the queue, removed from the queue, or relocated within the queue by an operator via the controller 150. Further, at the same time as the surveying instrument is performing data collection tasks in accordance with the queue of tasks, a data collection task in the queue may be modified, for example by changing an area to be covered by a scan, changing the density/resolution of a scan, changing a point at which to perform a point measurement, or changing a zoom level of an image to be captured.

Figure 5:
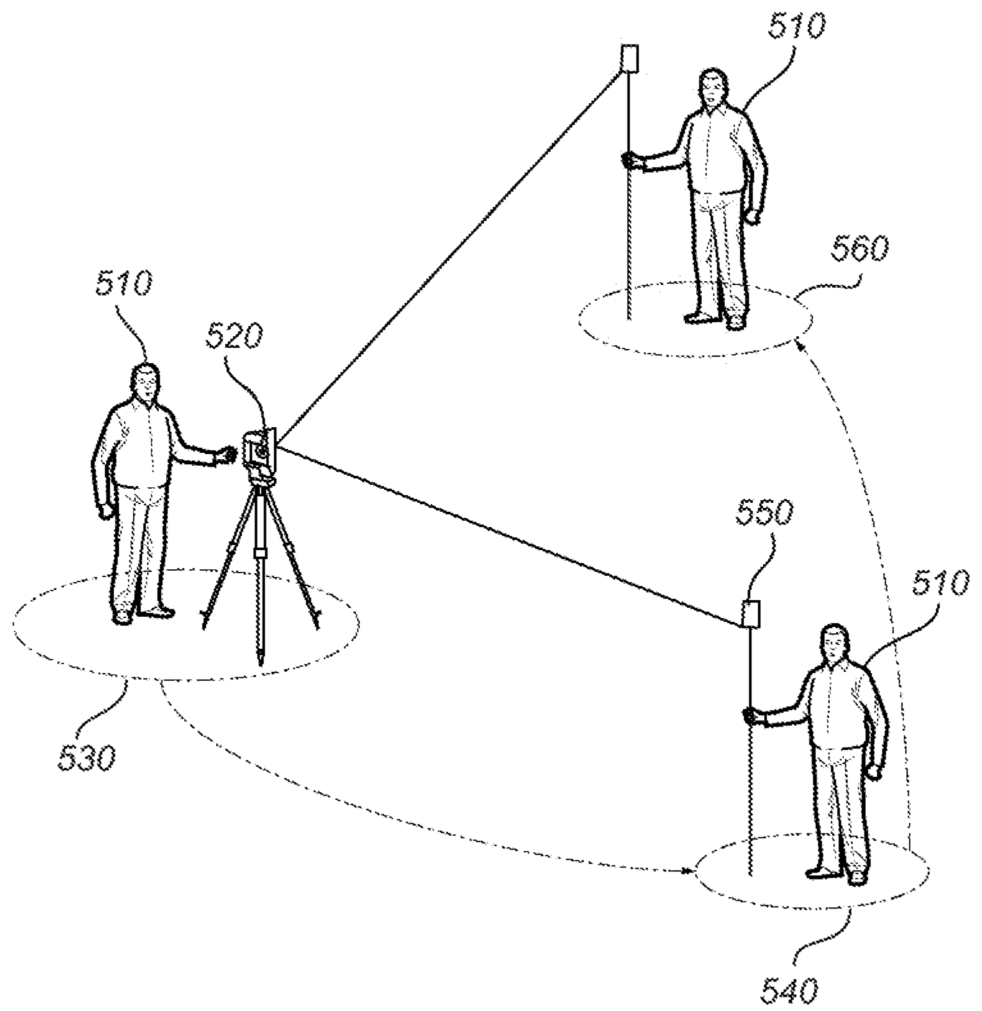
FIG. 5 illustrates how an operator may move between points of interest to perform geo referencing measurements.

Once a surveying instrument has been arranged at a location, reference measurements are often performed to determine the location and orientation of the instrument. This position and orientation are then employed to interpret data from subsequent data collection tasks, for being able to correctly put the data in a common coordinate system. This is often referred to as geo referencing. FIG. 5 illustrates how an operator 510 may move (for example by walking or driving) between different locations for performing geo referencing measurements. Distances and angles (or directions) measured to two different known positions are sufficient to compute the position and orientation of the surveying instrument. Traditionally, an operator 510 sets up the instrument 520 at an appropriate position 530, then moves over to a first position 540 carrying a target 550 equipped with an optically reflecting element such as a prism. The coordinates of this first position 540 may for example be determined via use of a Global Navigation Satellite System (GNSS) receiver (for example using the Global Positioning System, GPS) arranged at the target 550. A first measurement is then performed via reflection against the target 550 at the first position 540. The operator 510 then moves over to a second position 560 and performs another measurement using the target 550. Once these geo referencing measurements have been performed (including distances and angles to the two known positions), the position and orientation of the surveying instrument 520 is computed, and other data collection tasks may then be performed.

It may take quite some time for the operator 510 to move between the different positions 530, 540 and 560. The present embodiments provide that the time used for an operator to move between different positions used for geo referencing may be employed for performing other data collections tasks even though the geo referencing has not been completed. Indeed, data from such other data collection tasks may be saved and put into the correct coordinate system later on once the position and orientation of the surveying instrument has been determined via the geo referencing measurements. This will now be described below with reference to FIG. 6.

Figure 6:
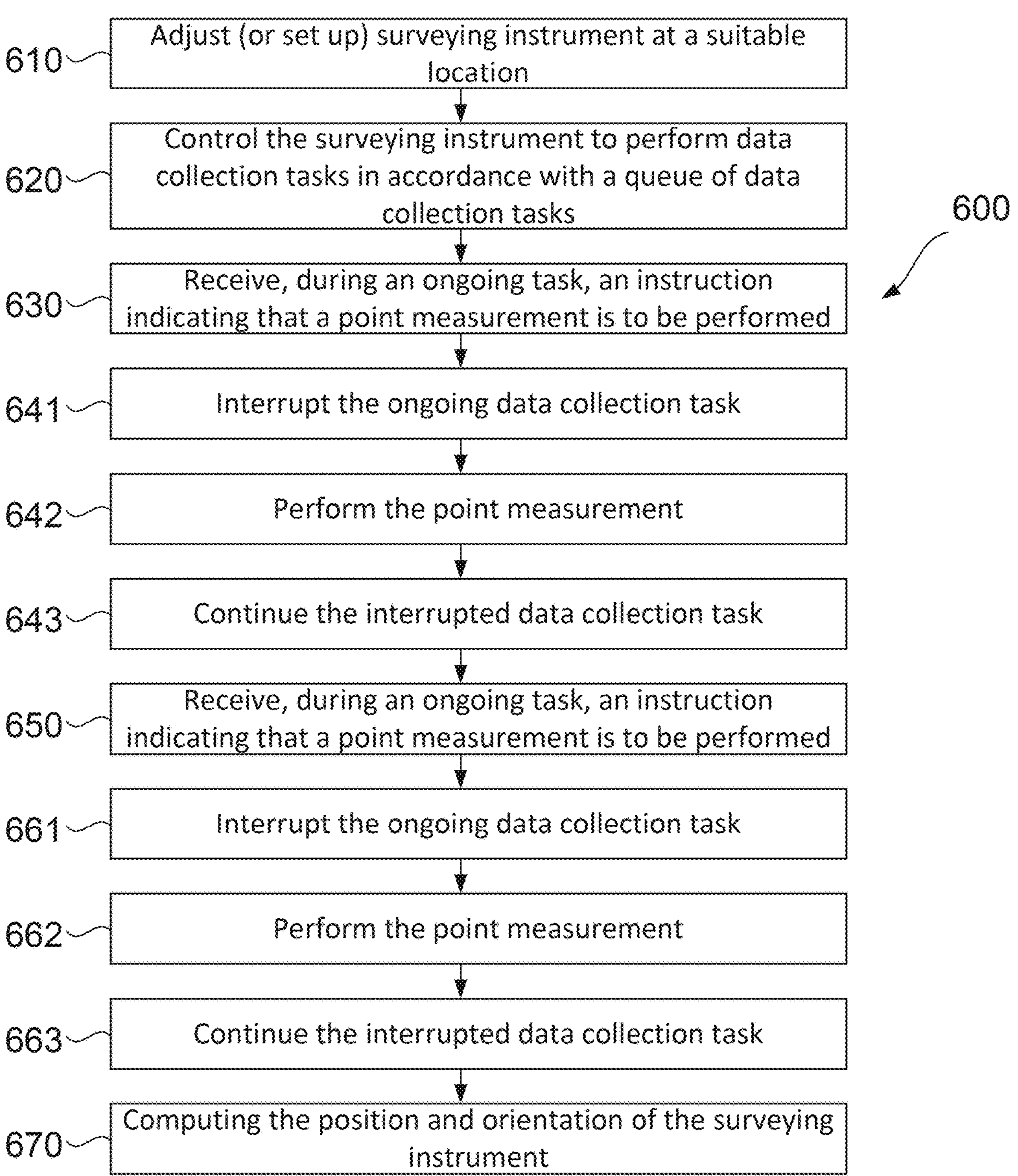
FIG. 6 is a flow chart of a method for controlling a surveying instrument to interrupt an ongoing data collection task in order to perform geo referencing measurements, according to an embodiment.

FIG. 6 is a flow chart of a method 600 for controlling a surveying instrument 520 to interrupt an ongoing data collection task to perform geo referencing measurements, according to an embodiment. The method 600 may be regarded as an example implementation of the method 300 described above with reference to FIG. 3.

The operator 510 arranges (or sets up) 610 the surveying instrument 520 at a suitable location 530. This may include adjusting the orientation of the surveying instrument 520 such that the surveying instrument 520 is correctly aligned relative to the horizontal plane.

Once the surveying instrument 520 has been arranged properly, it may be controlled 620 to perform data collection tasks in accordance with a queue of data collection tasks. This may for example include initiating a relatively time-consuming task such as scan of the environment, wherein EDM measurements are performed to obtain a 3D cloud of measurement points. Another example of a relatively time-consuming task may be to capture a panorama view of the environment using a camera mounted at the surveying instrument 520. The step 620 of the method 600 may correspond to the step 310 in the method 300 described above with reference to FIG. 3.

While data collection tasks are being performed by the surveying instrument 520, the operator 510 moves over to the first position 540, for example by walking. When the operator arrives at the first position 540, the operator 510 may instruct the surveying instrument 520 (for example via a controller 150) that it is time to perform a geo referencing measurement. The instruction may for example be given by pushing a button 153 of a controller 150 of the surveying instrument 520, or entering a command via the controller 150. The controller 150 therefore receives 630, during an ongoing task such as a scan, an instruction indicating that a point measurement is to be performed. This step 630 corresponds to the step 320 of the method 300 described above with reference to FIG. 3.

The ongoing data collection task is then interrupted 641, the point measurement is performed 642 and the interrupted data collection task is then continued 643. These steps 641-643 may correspond to the steps 331-333 of the method 300 described above with reference to FIG. 3. The ability to interrupt an ongoing data collection task is particularly useful in case the ongoing task is time-consuming, such as a detailed scan of a large region. By interrupting the scan when the operator 510 has reached the first position 540, the operator 510 does not have to wait a long time for the time-consuming task to be completed. Instead the point measurement may be performed more or less immediately. Further, by starting a scan directly after having installed the surveying instrument, the utilization of the surveying instrument is improved as a data collection task can be performed more or less in parallel or simultaneously as the procedure for geo referencing, even if the scan may have to be interrupted (temporarily) for performing some individual point measurements at a certain number of known locations.

The operator 510 then moves over to the second position 560 while the surveying instrument 520 continues the ongoing data collection task. When the operator arrives at the second position 560, the same procedure is repeated as for the first position 540. The operator 510 inputs that it is time to perform a geo referencing measurement. The controller 150 therefore receives 650, during an ongoing task such as a scan, an instruction indicating that a point measurement is to be performed. The ongoing data collection task is then interrupted 661, the point measurement is performed 662, and the interrupted data collection task is then continued 663.

Once point measurements for the first position 540 and the second position 560 have been obtained, the position and orientation of the surveying instrument 510 may be computed 670. In this way, geo referencing of data collected by the surveying instrument 520 may be performed retroactively. Further point measurements may be performed for a more accurate positioning.

The method 600 allows the surveying instrument 520 to perform measurements (and/or capture images) while the operator 510 moves between different positions. The surveying instrument 520 may therefore be more efficiently employed, and time may be saved.

It will be appreciated that scans and panorama views ore only examples of data collection tasks which may be performed while the operator 520 moves between the positions 530, 540 and 560. Other data collection tasks such as point measurements and snap shots by a camera may also be in the queue of data collection tasks performed by the surveying instrument 510 while the operator 510 is moving. It will also be appreciated that the operator may move between the different locations by other means than walking, such as by driving a vehicle. The operator may for example be a human or a robot.

Figure 7:
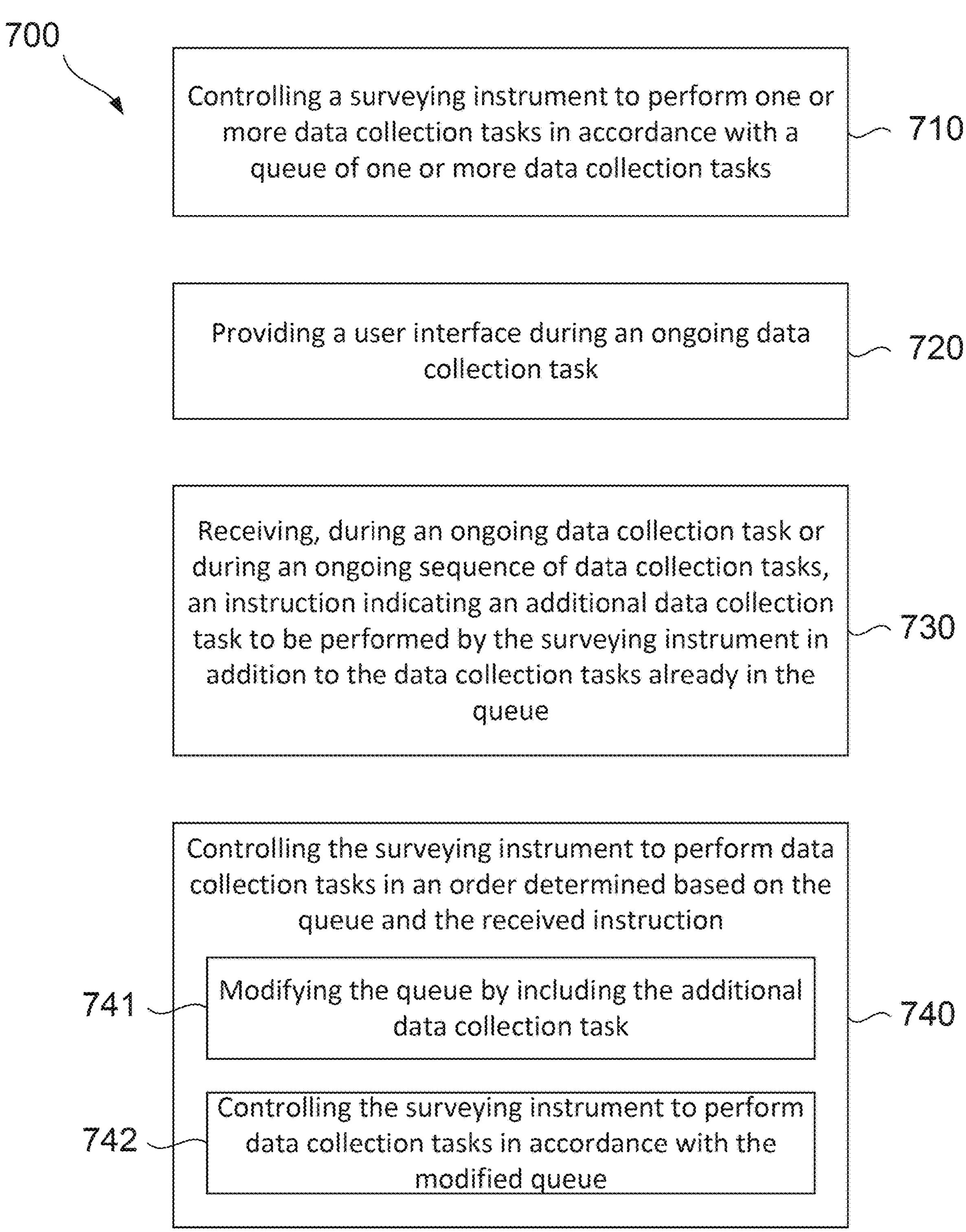
FIG. 7 is a flow chart of a method for controlling a surveying instrument, wherein a user interface for defining an additional data collection tasks is provided, according to an embodiment.

FIG. 7 is a flow chart of a method 700 for controlling a surveying instrument, such as the scanner 100 or the total station 200 described above with reference to FIGS. 1 and 2. The method 700 is similar to the method 300 described above with reference to FIG. 3, but instead of interrupting an ongoing task to initiate a new task, the new task is placed in the queue of data collection tasks. The method 700 may for example be performed by the control section 150 (or the processor 156 of the controller 150) described above with reference to FIGS. 1 and 2.

The method 700 comprises controlling 710 the surveying instrument to perform one or more data collection tasks in accordance with a queue of one or more data collection tasks. This may correspond to the step 310 of the method 300 described above with reference to FIG. 3.

The method 700 comprises receiving 730, during an ongoing data collection task or during an ongoing sequence of data collection tasks, an instruction indicating an additional data collection task to be performed by the surveying instrument in addition to the one or more data collection tasks already in the queue. This may correspond to step 320 of the method 300 described above with reference to FIG. 3.

The method 700 comprises controlling 740 the surveying instrument to perform data collection tasks in an order determined based on the queue and the received instruction. In contrast to the step 330 of the method 300 described above with reference to FIG. 3 (where the ongoing task is interrupted), the step 740 includes modifying 741 the queue by including, in the queue, the additional data collection task indicated by the received instruction, and controlling 742 the surveying instrument to perform data collection tasks in accordance with the modified queue. The additional data collection task may for example be placed first in the queue so that it is performed as soon as the ongoing task has been completed. Alternatively, the additional task may be placed last in the queue of data collection tasks.

Traditionally, data collection tasks such as a scan of a certain region may be defined by the operator while watching the surroundings of the surveying instrument in real time through a camera mounted at the surveying instrument. However, since the camera is mounted at the surveying instrument, it is not available for such purposes while the surveying instrument is performing other data collection tasks, such as a scan where the surveying instrument (and thereby the camera) is being rotated.

The inventors have realized that data collected by the surveying instrument (such as images captured by a camera or a 3D cloud of point measurements from a scan) may be employed to define new data collection tasks while the surveying instrument is performing data collection tasks. Hence, in the method 700, a user interface may be provided 720 during an ongoing data collection task. In the present embodiment, the user interface allows an operator to define an additional data collection task based on data previously collected by the surveying instrument. When the operator defines this additional data collection task via the user interface, an instruction may be received 730 by the controller 150 indicating that this additional data collection task is to be performed.

Embodiments may be envisaged in which the user interface is provided 720 during an ongoing data collection task for defining the additional data collection task, while the instruction indicating that the additional data collection task is to be performed could actually be received 730 by the controller 150 after the ongoing data collection task has been completed. The instruction may for example be received during a delay between tasks in an ongoing sequence of data collection tasks, where the sequence of tasks is defined by the queue.

Figure 8:
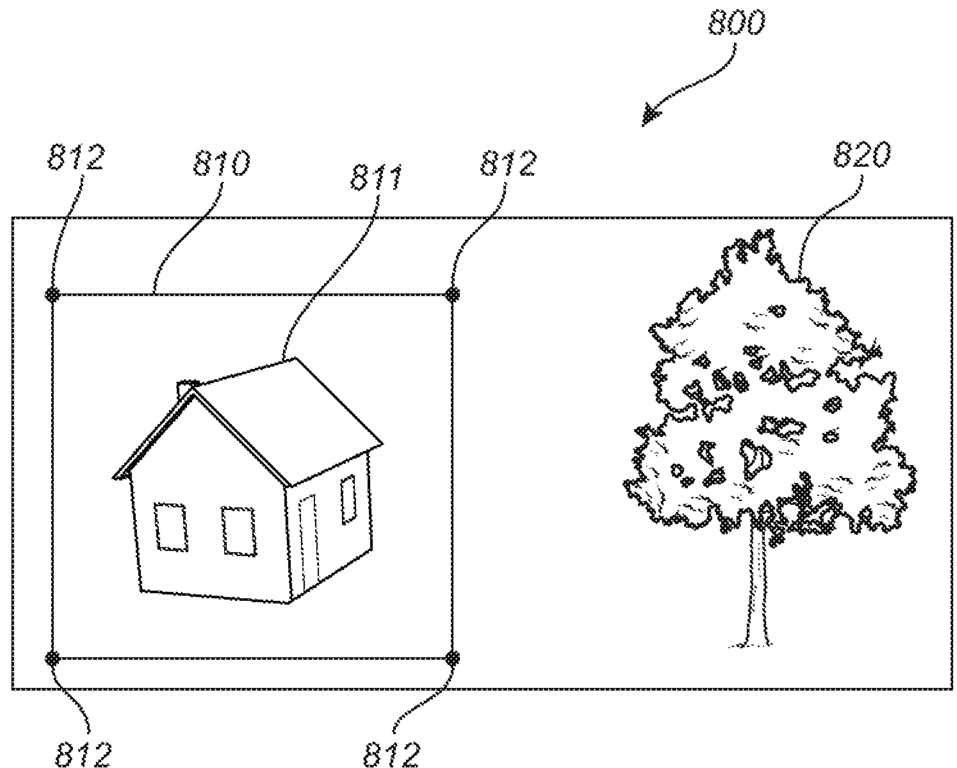
FIG. 8 illustrates an example user interface for defining an additional data collection task to be performed by a surveying instrument.

FIG. 8 illustrates an example user interface 800 for defining an additional data collection task to be performed by a surveying instrument. In the present example, an initial image or panorama view obtained by the surveying instrument comprises a region of interest 810 including a building 811. A tree 820 is also visible, but it is outside the region of interest 810. Such previously collected data may be employed to define an additional data collection task to be performed. The operator may wish to have a close up photograph of the building 811, or a detailed scan of the building 811. A visual display (such as the display 152 of the controller 150 described above with reference to FIG. 1) may be controlled to visualize the data previously collected by the surveying instrument. The operator may then define at the display where to perform measurements or to capture images. For example, the operator may employ a mouse pointer and/or buttons to indicate on the display where to measure or take photographs. Alternatively, the display may be a touch screen display on which the user may indicate a region of interest to be covered by a detailed scan or to be covered by a close up photograph. In other words, the user interface 800 allows the user to define sighting directions of the surveying instrument for which to acquire sensor signals (for example EDM signals or camera signals) as part of the additional data collection task. The user interface 800 may for example be able to visualize 3D clouds of point measurements, so that the operator may define the additional data collection task based on such previously collected point measurements. An area 810 to be scanned may for example be indicated by the operator by indicating corners 812 of the area 810 on the visual display. The user interface 800 described with reference to FIG. 8 may for example be provided 720 during an ongoing data collection task, as the step 720 of the method 700.

In an example scenario, an operator may first set up a surveying instrument, then have the surveying instrument capture a quick panorama view using a wide angle camera with relatively low resolution. The operator may then have the surveying instrument perform a scan of the environment. During the scan, the operator may employ the interface 800 to define points for which to capture high precision camera images. The points may be defined based on data from the panorama and/or the ongoing scan. The task of collecting these high precision images may either be performed straight away via an interrupt, or may be put in a queue of data collection tasks to be performed once the ongoing scan has been completed.

The user interface 800 may for example be employed to:

define a more detailed scan of an area already scanned, using data from the previous scan;

define, using data from an initial scan, a point measurement for a point of interest with higher accuracy than at the initial scan; or define a high precision image to be captured by a camera, using data from a previous scan or panorama view.

A user sitting at a remote office may for example analyze the data collected by the surveying instrument, may be able to define (in real time) new data collection tasks to be performed by the surveying instrument, and may also be able to add those tasks into the queue. The remotely located user may for example communicate with the surveying instrument via a wired or wireless data connection.

A user analyzing data collected by the surveying instrument may for example detect that settings of the surveying instrument need to be adjusted, or that the surveying instrument needs to be recalibrated. The user may then interrupt the ongoing data collection task to adjust the settings or perform the calibration.

The person skilled in the art realizes that the present invention is by no means limited to the preferred embodiments described above. On the contrary, many modifications and variations are possible within the scope of the appended claims. For example, the scanner 100 and the total station 200 described above with reference to FIGS. 1 and 2 only serve as examples of surveying instruments. It will be appreciated that the methods disclosed herein may be employed also with other types of surveying instruments configured to perform different types of data collection tasks. It will also be appreciated that the specific data collection tasks mentioned herein only serve as examples. For example, more or less any type of data collection task performed by a surveying instrument may be interrupted so that another task may be performed by the surveying instrument.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope.

The invention claimed is:

1. A method of controlling a surveying instrument operable to perform different types of survey measurements, wherein at least one of the different types of survey measurements includes performing laser scanning using a rotating prism or mirror to determine coordinates of points in a point cloud, and wherein at least another one of the different types of survey measurements includes performing an individual point measurement to determine a distance and a direction to a previously identified reflecting element placed proximate to but spaced from a target, the method comprising:

controlling the surveying instrument to perform a laser scanning operation in accordance with a queue of survey measurements including the laser scanning operation, the queue also including another survey measurement of at least one of said different types of survey measurements;

receiving, during the laser scanning operation and via a touch screen or a button, an instruction indicating an additional survey measurement to be performed by the surveying instrument in addition to the survey measurements already in the queue, wherein the additional survey measurement includes performing the individual point measurement to determine the distance and the direction to the previously identified reflecting element placed proximate to but spaced from the target;

interrupting the laser scanning operation and controlling the surveying instrument to perform the additional survey measurement indicated by the received instruction; thereafter reinserting a remaining portion of the laser scanning operation into the queue after completing the additional survey measurement;

controlling the surveying instrument to continue the laser scanning operation by performing the remaining portion of the laser scanning operation;

controlling the surveying instrument to perform the survey measurements in an order determined based on the queue, wherein said laser scanning operation includes a plurality of measurements corresponding to respective different sighting directions of the surveying instrument, and wherein the additional survey measurement indicated by the received instruction includes a measurement of higher precision than the measurements of said laser scanning operation, wherein the measurement of higher precision involves a reflection of light from a corner cube prism, wherein an ongoing sequence of the survey measurements as defined by the queue comprises delays between the respective survey measurements, the method further comprising:

during the delays of the ongoing sequence of survey measurements, receiving a second instruction to perform another survey measurement not already in the queue;

in response to receiving the second instruction, modifying the queue by at least modifying a survey measurement in the queue or removing a survey measurement from the queue; and controlling the surveying instrument to perform the survey measurements in accordance with the modified queue.

2. The method of claim 1, wherein said laser scanning operation takes longer time to complete than the additional survey measurement indicated by the received instruction.

3. The method of claim 1, wherein the additional survey measurement indicated by the received instruction includes computing an orientation and a position of the surveying instrument based on data collected by the additional survey measurement indicated by the received instruction.

4. The method of claim 1, further comprising:

during said laser scanning operation, providing a user interface for defining, based on data previously collected by the surveying instrument, the additional survey measurement indicated by the received instruction.

5. The method of claim 4, wherein the user interface is provided for defining, based on data previously collected by the surveying instrument, one or more sighting directions of the surveying instrument for which to acquire sensor signals as part of the additional survey measurement.

6. The method of claim 4, wherein providing the user interface includes controlling a display to visualize said data previously collected by the surveying instrument.

7. The method of claim 1, wherein the laser scanning operation includes acquiring a sequence of sensor signals corresponding to respective different sighting directions from the surveying instrument.

8. A non-transitory computer-readable medium storing instructions that, when executed by a computer, cause the computer to perform the method of claim 1.

9. A controller for controlling a surveying instrument, the controller configured to perform steps comprising:

controlling the surveying instrument to perform a laser scanning operation in accordance with a queue of survey measurements including the laser scanning operation;

receiving, during the laser scanning operation, an instruction indicating an additional survey measurement to be performed by the surveying instrument in addition to the survey measurements already in the queue, wherein the additional survey measurement includes performing an individual point measurement to determine a distance and a direction to a previously identified reflecting element placed proximate to but spaced from a target;

interrupting the laser scanning operation and controlling the surveying instrument to perform the additional survey measurement indicated by the received instruction; thereafter controlling the surveying instrument to continue the laser scanning operation by performing the remaining portion of the laser scanning operation; and controlling the surveying instrument to perform the survey measurements in an order determined based on the queue, wherein said laser scanning operation includes a plurality of measurements each corresponding to respective different sighting directions of the surveying instrument, and wherein the additional survey measurement indicated by the received instruction includes a measurement of higher precision than the measurements of said laser scanning operation.

10. A surveying instrument comprising:

one or more sensors for performing different types of survey measurements; and the controller of claim 9.

11. The surveying instrument of claim 10, comprising:

a scanning head rotatable about an axis, wherein the surveying instrument is arranged to perform measurements in different directions via use of the scanning head.

12. The surveying instrument of claim 10, comprising:

a base;

an alidade mounted at the base for rotation about a first axis; and a center unit mounted at the alidade for rotation about a second axis, wherein the surveying instrument is arranged to perform measurements in different directions via use of the center unit.

13. A method of controlling a survey instrument configured to perform laser scanning operations and individual point measurements, wherein the individual point measurements are used to determine a position of the survey instrument, and the position of the survey instrument is used to determine geo referenced positions of measurement points from the scanning operations, the method comprising:

controlling the surveying instrument to perform a laser scanning operation that includes obtaining a plurality of measurements each at different sighting directions of the surveying instrument to generate a three-dimensional (3D) cloud of measurement points, the laser scanning operation defining an area to be scanned and a density of the measurement points within the area;

receiving, during the laser scanning operation, a first instruction indicating a first additional survey measurement to be performed by the surveying instrument, wherein the first additional survey measurement indicated by the received first instruction includes performing a first individual point measurement to determine first angles and a first distance between the surveying instrument and a previously identified reflecting element placed proximate to but spaced from a first position;

controlling, during the laser scanning operation, the surveying instrument to interrupt the laser scanning operation;

controlling, after interrupting the laser scanning operation, the surveying instrument to perform the first additional survey measurement indicated by the received first instruction;

controlling, after performance of the first additional survey measurement, the surveying instrument to continue the interrupted laser scanning operation; thereafter receiving, during the continued laser scanning operation, a second instruction indicating a second additional survey measurement to be performed by the surveying instrument, wherein the second additional survey measurement indicated by the received second instruction includes performing a second individual point measurement to determine second angles and a second distance between the surveying instrument and the previously identified reflecting element placed proximate to but spaced from a second position different from the first position;

controlling, during the continued laser scanning operation, the surveying instrument to interrupt the continued laser scanning operation;

controlling, after interrupting the continued laser scanning operation, the surveying instrument to perform the second additional survey measurement indicated by the received second instruction;

controlling, after performance of the second additional survey measurement, the surveying instrument to continue the interrupted laser scanning operation;

computing a position of the surveying instrument based on at least the first individual point measurement obtained as a result of the received first instruction and the second individual point measurement obtained as a result of the received second instruction; and determining geo referenced positions of the measurement points of the 3D cloud based on the computed position of the surveying instrument.

14. The method of claim 13, further comprising receiving one or more additional instructions indicating one or more additional individual point measurements to be performed by the surveying instrument in addition to the first individual point measurement and the second individual point measurement, and controlling the surveying instrument to perform the one or more additional individual point measurements, wherein computing the position of the surveying instrument is also based on the one or more additional individual point measurements.

* * * * *